Dec. 7, 1937.    A. KEGRESSE    2,101,618
ENDLESS TRACK FOR VEHICLES
Filed May 22, 1935
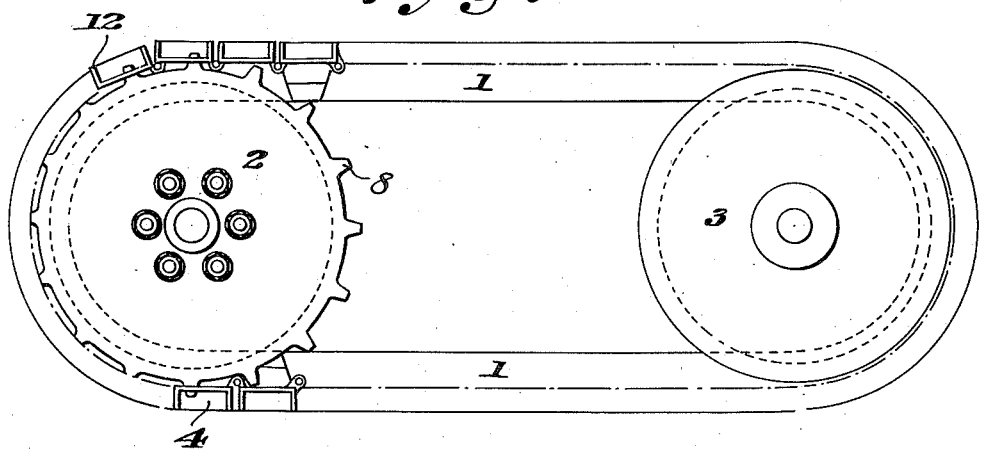
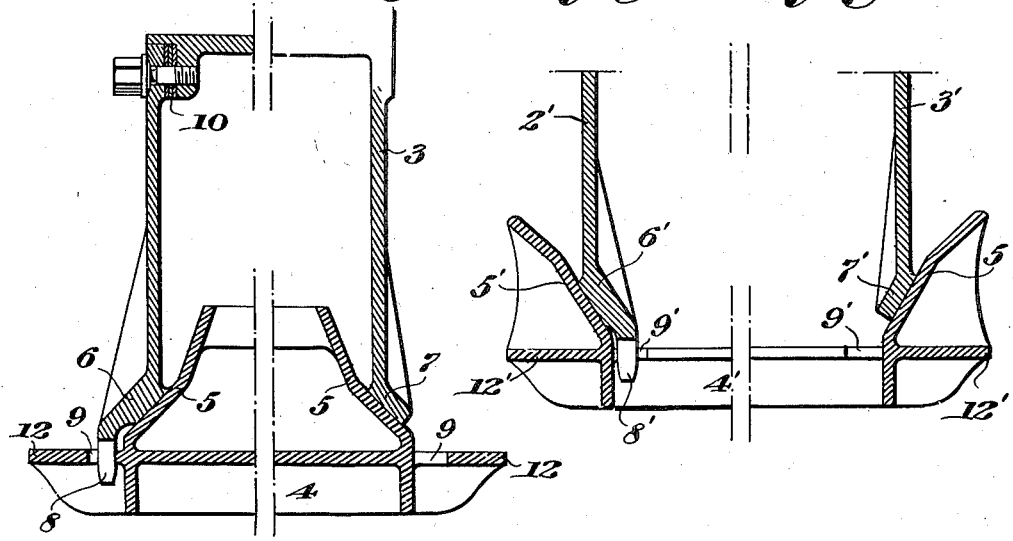
Inventor,
ADOLPHE KEGRESSE
By Bönnelycke, Young, Emery & Thompson
Attys.

Patented Dec. 7, 1937

2,101,618

UNITED STATES PATENT OFFICE 2,101,618

ENDLESS TRACK FOR VEHICLES

Adolphe Kegresse, Paris, France

Application May 22, 1935, Serial No. 22,895
In France May 29, 1934

5 Claims. (Cl. 305—8)

In all the known endless tracks with shoes, the flat portions of the shoes bear on the cylindrical rims of the carrying wheels.

In some constructions, the track rests by its driving device on the base of the teeth of the driving wheel, but the idle wheel receives the track by means of a cylindrical rim.

In all the known endless tracks with shoes, the engagement of the track with the carrying wheels is effected either by the flat parts of the shoes being in contact with the cylindrical rim of the wheels or by a wedge-like member on the shoe engaging a closed groove of V-shape cross-section provided in the rim of the wheels.

In some cases the track is supported on the driving wheel by its driving means engaging the bottom of the teeth of the wheel, whereas the idler wheel receives the track by means of a cylindrical rim or by a V-shaped closed groove in the surface of the wheels.

All the known arrangements constructed according to the foregoing very general rules suffer from a number of disadvantages:

1. They are, in general, noisy, since the track formed by plane surfaces (shoes) riveted together can only be polygonal, and consequently the engagement of the wheels with the track is discontinuous. Since the track can only engage the carrying wheels along a line of contact parallel to the axis of the wheels, for each shoe, there is inevitably produced at each contact a noisy impact, which is more intense, the greater the speed. In the case of endless tracks carried in closed V-shaped grooves, the small parts of the track when travelling over irregular ground do not have proper clearance in the groove and present such inconveniences that they are not used in practice.

2. With wear, the pitch of the track varies. This is contrary to correct meshing and necessitates premature rejection of rather expensive parts.

3. Portions of soil find their way in the teeth of the driving wheel and of the track, and are detrimental to correct meshing.

4. In addition to its driving teeth, the track requires a special guiding device.

These disadvantages are to be found in all types of tracks having separate shoes, whether the latter are assembled by means of pivots or are mounted on a flexible core.

It is an object of the present invention to remedy or to correct these disadvantages in a large measure.

Structure embodying the present invention are shown by way of example in the accompanying drawing in which:

Figure 1 shows a view in elevation of the track mounted on its driving wheel and idle wheel.

Figure 2 shows in section a half-shoe and its driving half-wheel.

Figure 3 is a view in section of a half-shoe and its idle half-wheel.

Figure 4 is a modification of Figure 2, in which the shoes run on the exterior of the driving wheels.

Figure 5 is a corresponding modification of Figure 3.

The device as a whole comprises an endless track 1 of known type (Figure 1), a toothed driving wheel or sprocket 2 (Figures 1 and 2) and an idle wheel 3 (Figures 1 and 3).

The shoes of the track comprise, as in the known devices, a face 4 with projections which make contact with the ground. This face may obviously carry rubber blocks for travelling on hard ground, as is moreover known.

The opposite face principally comprises two large ribs 5 (Figures 2 and 3) inclined relatively to the vertical plane.

These inclined faces 5, which may comprise portions at different angles, as is shown in the drawing, bear by their base on the walls or rims 6 (Figure 2) of the driving wheel and also on the walls 7 (Figure 3) of the idle wheel, the said walls being made conical for this purpose.

The teeth 8 (Figures 1 and 2) of the driving wheel 2 engage appropriate openings 9 (Figures 2 and 3) provided for this purpose in the shoes.

The idle wheel 3 (Figures 1 and 3) does not of course comprise any teeth.

In order to remedy the disadvantage of the change of pitch due to the elongation of the band or to wear, the distance between the two driving half-wheels 2 (Figure 2) is made variable, for example by means of spacing washers 10 (Figure 2) disposed between the wheel 2 (Figure 2) and its hub 11 (Figure 2).

It will be readily appreciated that by removing or adding spacing washers 10 (Fig. 2), the two driving half-wheels 2 (Figure 2) mounted symmetrically on the same hub will be moved nearer to or further away from each other and will consequently cause the running diameter of the track to vary, which will of course result in a corresponding variation of the angular pitch of meshing.

When the device is new, the toothed half-wheels 2 are moved away from each other to the maximum amount, and the running diameter is a minimum. When the wear of the shoe pivots or the elongation of the band makes itself felt, the pitch of the endless track increases and meshing is no longer satisfactory. At this time the two half-wheels 2 (Figure 2) are moved towards each other by removing one or more washers 10 (Figure 2) so as to increase the running diameter of the track, which likewise increases the diameter of the pitch circle of meshing and consequently the length of the pitch. This device renders it possible to make corrections of pitch, the magnitude of which depends upon the height of the driving teeth 8 (Figures 1 and 2) of the driving sprocket and of the lateral play of the openings 9 (Figures 2 and 3) in which the teeth 8 engage.

In Fig. 4, a modification of the structure of Fig. 2 is shown. According to this figure, the driving half-wheel or disc 2' is provided with driving teeth 8' and inclined walls 6', the walls 6' being inclined differently from those of Fig. 2. The shoes of the track in this form of invention comprise a face 4' corresponding to face 4 of the form shown in Fig. 2, two large ribs 5' corresponding to ribs 5 of Fig. 2, but inclined outwardly to fit the walls 6'.

Adjustment between discs of wheels 2' is effected in the same manner as in the case of Fig. 2.

The teeth 8' engage in openings 9' provided in the sole plates 12' of the shoes.

The idle wheel 3' (Fig. 5) is provided with an inclined face 7', but has no teeth.

It should be observed that in the case of Figures 4 and 5, the moving of the driving half-wheels away from or towards each other will have an opposite effect to that of Figures 2 and 3, without however in any way altering the idea of the invention.

It will likewise be observed that in both cases (Figures 2 and 3) or (Figures 4 and 5), it is possible to construct the same device with half-wheels mounted to touch one another, the construction of the shoe being of course rendered appropriate. This variation in the construction will not detract in any way from the character of the invention.

The teeth 8 and 8' (Figures 1, 2, and 4) pass through the sole plates 12 and 12' (all the figures) of the shoes by way of the openings 9 and 9' respectively (Figures 2, 3, 4 and 5) which are made wider than the thickness of the teeth 8 and 8'. Furthermore, the shoes do not rest on the bottom of the teeth, but bear on the driving wheel by an inclined face 5 or 5' (Figures 2 and 4). The teeth only come into contact with the shoes by their driving faces. This arrangement, as will be readily appreciated, prevents portions of earth from interfering with the gearing and obviates the "choking" which is so detrimental in endless tracks.

It will be appreciated that with this construction, the contact of the shoes on the wheels 2 and 3 or 2' and 3' is made by two inclined surfaces instead of plane surfaces and will therefore be less noisy than in the latter case, because the shoes—at the moment of making contact with the wheels—will in a manner wedge themselves, that is with sliding, in the latter, instead of bearing on them with a violent shock.

For correcting the tension of the band, it is possible to employ the idle wheel, constructed on the same principle as the driving wheel. The said tension may be varied by increasing or reducing the distance between the two idle half-wheels, so as to cause the running diameter of the band to vary.

It is clear that this latter variation of tension will have no connection with the correction of the pitch, which is obtained with the driving wheel only.

It will be seen, furthermore, that this form of construction dispenses with the special guiding devices which all endless track bands have employed heretofore, because in this case guiding is ensured by the inclined ribs 5, which, as previously explained, serve at the same time as support on the carrying wheels.

I claim:

1. An endless track vehicle comprising spaced carrying wheels each formed of two axially spaced parallel discs, each of said discs being provided at its periphery with a frusto-conical flange, and an endless track extending about said wheels, said endless track comprising pivotally connected tread plates and guiding ribs projecting from the inner faces of the plates, said ribs having inclined base portions for engaging the frusto-conical flanges of the wheels, and teeth on the peripheries of the flanges of one of said wheels extending through openings in said plates for transmitting driving motion from said wheel to said track.

2. An endless track vehicle comprising spaced carrying wheels, each of which comprises axially spaced parallel discs, means for varying the axial spacing of said discs, and a frusto-conical flange carried at the periphery of each disc, and an endless track, said track comprising pivotally connected tread plates and inclined ribs on the inner face of said plates engaging said frusto-conical flanges of the wheels.

3. An endless track vehicle comprising spaced carrying wheels each formed of two axially spaced parallel discs, each of said discs being provided at its periphery with a frusto-conical flange inwardly of each disc and an endless track extending about said wheels, said endless track comprising pivotally connected tread plates and guiding ribs projecting from the inner faces of the tread plates, said ribs having outer inclined base portions for engaging the frusto-conical flanges of the wheels, and teeth carried by the peripheries of the flanges of one of said wheels extending through openings in the tread plates for transmitting driving motion from said wheel to said track.

4. An endless track vehicle comprising spaced carrying wheels each formed of two axially spaced parallel discs, each of said discs being provided at its periphery with a frusto-conical flange outwardly of each disc and an endless track extending about said wheels, said endless track comprising pivotally connected tread plates and guiding ribs projecting from the inner faces of the tread plates, said ribs having inner inclined base portions for engaging the frusto-conical flanges of the wheels, and teeth carried by the peripheries of the flanges of one of said wheels extending through openings in the tread plates for transmitting driving motion from said wheel to said track.

5. An endless track vehicle comprising spaced carrying wheels each formed of two axially movable spaced parallel discs, each of said discs being provided at its periphery with a frusto-conical flange and an endless track extending about said wheels, said endless track comprising pivotally connected tread plates and guiding ribs projecting from the inner faces of the tread plates, said ribs having inclined base portions for engaging the frusto-conical flanges of the wheels, teeth carried by the peripheries of the flanges of one of said wheels extending through openings in the tread plates for transmitting driving motion from said wheel to said track, and means for varying the spacing between both discs.

ADOLPHE KEGRESSE.